US008914453B2

(12) United States Patent
Dawar et al.

(10) Patent No.: US 8,914,453 B2
(45) Date of Patent: Dec. 16, 2014

(54) METHOD AND APPARATUS FOR MOTION BASED PING DURING CHAT MODE

(75) Inventors: Annupum Dawar, Waterloo (CA); Sean Hungerford, Kitchener (CA)

(73) Assignee: BlackBerry Limited, Waterloo (CA)

( * ) Notice: Subject to any disclaimer, the term of this patent is extended or adjusted under 35 U.S.C. 154(b) by 71 days.

(21) Appl. No.: 13/551,778

(22) Filed: Jul. 18, 2012

(65) Prior Publication Data

US 2014/0025750 A1    Jan. 23, 2014

(51) Int. Cl.
*G06F 15/16*    (2006.01)
*H04N 5/232*    (2006.01)
*G06F 17/30*    (2006.01)

(52) U.S. Cl.
CPC ...... *H04N 5/23254* (2013.01); *G06F 17/30811* (2013.01)
USPC .......................... 709/206; 455/550.1; 715/863

(58) Field of Classification Search
CPC ..................... H04L 17/26; H04L 2007/26909; G06F 3/0346; G06F 17/30811
USPC .......................................................... 709/206
See application file for complete search history.

(56) References Cited

U.S. PATENT DOCUMENTS

| 2008/0233996 | A1* | 9/2008 | Ogasawara et al. ........ 455/550.1 |
| 2010/0017759 | A1* | 1/2010 | Birnbaum et al. ............ 715/863 |
| 2011/0035453 | A1 | 2/2011 | Koul et al. |
| 2011/0163944 | A1 | 7/2011 | Bilbrey et al. |
| 2011/0264491 | A1* | 10/2011 | Birnbaum et al. ........... 705/14.4 |
| 2012/0056733 | A1* | 3/2012 | Ramsay et al. ............ 340/407.2 |

OTHER PUBLICATIONS

Google Patent Seach results.*

* cited by examiner

*Primary Examiner* — Arvin Eskandarnia
(74) *Attorney, Agent, or Firm* — Steven M. Greenberg, Esq.; Donna A. Flores, Esq.; CRGO Law (57) ABSTRACT

A system or method that incorporates teachings of the subject disclosure may include, for example, detecting a predetermined motion profile during a chat mode with a remote communication device and sending a ping signal to the remote receiving device in response to detecting the predetermined motion profile. Other embodiments are disclosed.

17 Claims, 4 Drawing Sheets

METHOD AND APPARATUS FOR MOTION BASED PING DURING CHAT MODE

FIELD OF THE DISCLOSURE

The subject disclosure relates to a communication technique, and more particularly to a method and apparatus for motion based ping during a chat mode.

BACKGROUND

Existing messaging systems rely on some form of feedback or cue to determine a category, the possible content, or the source of a message. For example, a smart phone may provide an audible or visual alert upon receipt of a phone call, a voice mail, or a text message. Setting or causing a smart phone to perform a desired alert typically involves the use of touch screens, multiple keys or buttons, and traversing conventional pull down menus or other hierarchical menus involving multiple steps.

Instant messaging or a chat mode enables the exchange of typed messages instantly over the internet or a cellular network using a shared software application on a personal computer or a mobile device. The standard use of touch screens, multiple keys or buttons, and menus fail to provide a comparable instant interaction for a user of the messaging device.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments of detecting a predetermined motion profile during a chat mode with a remote communication device and sending a ping signal to the remote receiving device in response to detecting the predetermined motion profile. The predetermined profile can be any number of profiles representative of a certain motion or physical gesture. A user of the communication device can record and store any number of motion profiles in a memory in the communication device where the motion profile corresponds to a user's particular physical gesture. In one or more examples, a communication system or communication device can communicate in a chat mode or in an instant messaging mode with the remote communication device and the communication device detects the predetermined motion profile using one or more of an accelerometer, a gyroscope, a global positioning service or Global Positioning System (GPS) sensor, an inclinometer, or a camera as examples. The ping signal can be a standard ping signal in one example or can include information causing a sensory change to the remote receiving device during the chat mode. The information included with the ping signal can cause the actuation of a haptic device at the remote receiving device for example. Other embodiments are contemplated by the subject disclosure.

One example of the subject disclosure includes a communication device including a memory storing computer instructions and a processor coupled to the memory. The processor, responsive to executing the computer instructions, performs operations including communicating in a chat mode with a remote receiving device, detecting a predetermined motion profile during the chat mode, and sending a ping signal to the remote receiving device in response to detecting the predetermined motion profile.

One example of the subject disclosure includes a non-transitory computer-readable storage medium having computer instructions which, responsive to being executed by at least one processor, cause the at least one processor to perform operations including communicating in a chat mode, by a communication device, with a remote receiving device, detecting, by the communication device, a predetermined motion during the chat mode, and sending a ping signal to the remote receiving device in response to detecting the predetermined motion.

Figure 1:
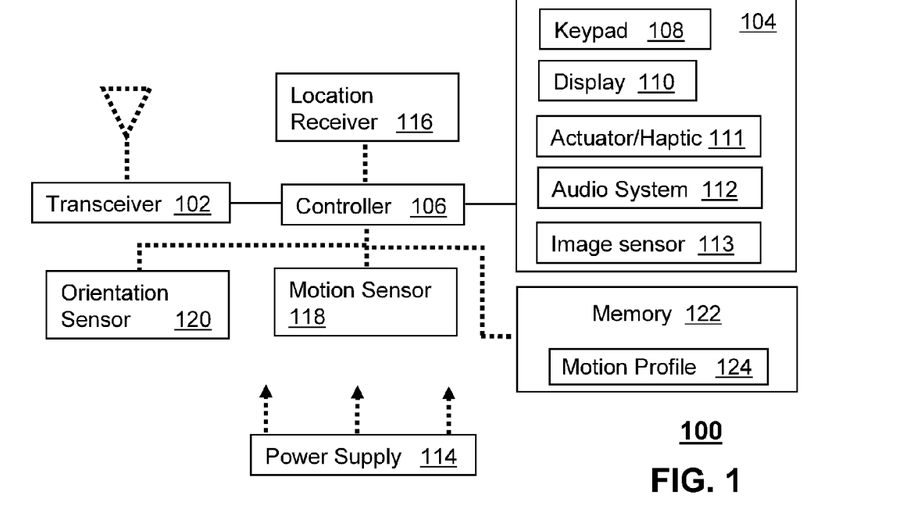
FIG. 1 depicts an illustrative example of a communication device.

FIG. 1 depicts an illustrative example of a communication device 100. The communication device 100 can comprise a wireline and/or wireless transceiver 102 having transmitter and receiver sections (herein transceiver 102), a user interface (UI) 104, a power supply 114, a location receiver 116, a motion sensor 118, an orientation sensor 120, a memory 122, and a controller 106 for managing operations thereof. The motion sensor 118 or orientation sensor 120 can comprise one or more of an accelerometer, a gyroscope, a GPS sensor, an inclinometer, an optical sensor, audio-spectrum sensors, ultrasonic transmitters and sensors, an infrared or other proximity sensor, or another sensor which can detect orientation or motion. The transceiver 102 can support short-range or long-range wireless access technologies such as Bluetooth, ZigBee, WiFi, Digital Enhanced Cordless Telecommunications (DECT), or cellular communication technologies, just to mention a few. Cellular technologies can include, for example, code division multiple access-1X (CDMA-1X), Universal Mobile Telephone System/High Speed Downlink Packet Access (UMTS/HSDPA), Global System for Mobile/General Packet Radio System (GSM/GPRS), time division multiple access/Enhanced Data GSM Environment (TDMA/EDGE), Evolution Data Optimized (EV/DO), Worldwide Interoperability for Microwave Access (WiMAX), Software Defined Radio (SDR), Long Term Evolution (LTE), as well as other next generation wireless communication technologies as they arise. The transceiver 102 can also be adapted to support circuit-switched wireline access technologies (such as Public Switched Telephone Network (PSTN)), packet-switched wireline access technologies (such as Transmission Control Protocol/Internet Protocol (TCP/IP), Voice over Internet Protocol (VoIP), etc.), and combinations thereof.

The UI 104 can include a depressible, touch-sensitive or virtual keypad 108 with a navigation mechanism such as a roller ball, an optical navigation module (i.e. trackpad), a joystick, a mouse, or a navigation disk for manipulating operations of the communication device 100. The keypad 108 can be an integral part of a housing assembly of the communication device 100 or an independent device operably coupled thereto by a tethered wireline interface (such as a Universal Serial Bus (USB) cable) or a wireless interface supporting, for example, Bluetooth. The keypad 108 can represent a numeric keypad commonly used by phones, and/or a QWERTY keypad with alphanumeric keys. The UI 104 can further include a display 110 such as monochrome or color Liquid Crystal Display (LCD), Organic Light Emitting Diode (OLED) or other suitable display technology for conveying images to an end user of the communication device 100. In an embodiment where the display 110 is touch-sensitive, a portion or all of the keypad 108 can be presented by way of the display 110 with navigation features.

The display 110 can use touch screen technology to also serve as a user interface for detecting user input (e.g., touch of a user's finger). As a touch screen display, the communication device 100 can be adapted to present a user interface with graphical user interface (GUI) elements that can be selected by a user with a touch of a finger. The touch screen display 110 can be equipped with capacitive, resistive or other forms of sensing technology to detect how much surface area of a user's finger has been placed on a portion of the touch screen display. This sensing information can be used control the manipulation of the GUI elements. The display 110 can be an integral part of the housing assembly of the communication device 100 or an independent device communicatively coupled thereto by a tethered wireline interface (such as a cable) or a wireless interface.

The UI 104 can also include an actuator or haptic device 111 that causes the communication device 100 to vibrate in accordance with an appropriate signal and setting as contemplated herein. The UI 104 can further include an audio system 112 that utilizes audio technology for conveying low volume audio (such as audio heard in proximity of a human ear) and high volume audio (such as speakerphone for hands free operation). The audio system 112 can further include a microphone for receiving audible signals of an end user. The audio system 112 can also be used for voice recognition applications. The UI 104 can further include an image sensor 113 such as a charged coupled device (CCD) camera for capturing still or moving images.

The power supply 114 can utilize common power management technologies such as replaceable and rechargeable batteries, supply regulation technologies, and/or charging system technologies for supplying energy to the components of the communication device 100 to facilitate long-range or short-range portable applications. Alternatively, or in combination, the charging system can utilize external power sources such as DC power supplied over a physical interface such as a USB port or other suitable tethering technologies.

The location receiver 116 can utilize common location technology such as a global positioning system (GPS) receiver capable of assisted GPS for identifying a location of the communication device 100 based on signals generated by a constellation of GPS satellites, which can be used for facilitating location services such as navigation. The motion sensor 118 can utilize motion sensing technology such as an accelerometer, a gyroscope, or other suitable motion sensing technology to detect motion of the communication device 100 in three-dimensional space. The orientation sensor 120 can utilize orientation sensing technology such as a magnetometer to detect the orientation of the communication device 100 (north, south, west, and east, as well as combined orientations in degrees, minutes, or other suitable orientation metrics). Other suitable motion or orientation sensing devices can include for example an inclinometer, an optical sensor, audio-spectrum sensors, ultrasonic transmitters and sensors, an infrared or other proximity sensor. While the orientation sensor 120, motion sensor 118, or image sensor can be used for detecting a particular or predetermined motion profile, the memory 122 can include a storage for storing one or more motion profiles 124.

The communication device 100 can use the transceiver 102 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 106 can utilize computing technologies such as a microprocessor, a digital signal processor (DSP), and/or a video processor with associated storage memory such as Flash, read only memory (ROM), random access memory (RAM), static random access memory (SRAM), dynamic random access memory (DRAM) or other storage technologies for executing computer instructions, controlling and processing data supplied by the aforementioned components of the communication device 100.

Other components not shown in FIG. 1 are contemplated by the subject disclosure. For instance, the communication device 100 can include a reset button. The reset button can be used to reset the controller 106 of the communication device 100. In yet another example, the communication device 100 can also include a factory default setting button positioned, for example, below a small hole in a housing assembly of the communication device 100 to force the communication device 100 to re-establish factory settings. In this example, a user can use a protruding object such as a pen or paper clip tip to reach into the hole and depress the default setting button.

The communication device 100 as described herein can operate with more or less of the circuit components shown in FIG. 1, depicted illustratively by the hash lines. These variant embodiments are contemplated by the subject disclosure.

Figure 2:
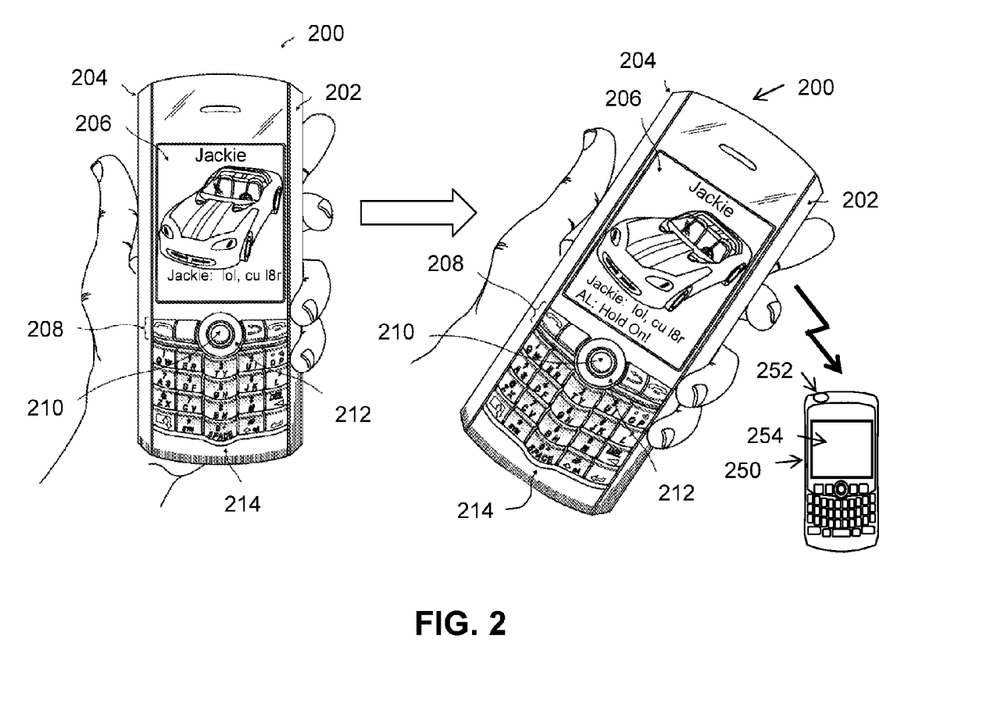
FIG. 2 depicts another illustrative example of a communication device as used in accordance with the embodiments.

FIG. 2 depicts an illustrative example of a communication device 200 similar to the communication device 100 of FIG. 1 which operates in a wireless network and communicates with other wireless devices. These figures are illustrative only, and those persons skilled in the art will appreciate the additional elements and modifications necessary to make the communication device 200 work in particular network environments. While in the illustrated example, the communication device 200 comprises a handheld communication device, and in this particular example, a smart phone, in other examples, the communication device 200 may comprise a handheld wireless communication device, a personal digital assistant (PDA), laptop computer, desktop computer, a server, or other communication device.

The communication device 200 includes a microprocessor or controller as shown in FIG. 1 that controls the operation of the communication device 200. A communication subsystem performs all communication transmission and reception with the wireless network. When the communication device 200 is equipped with a keyboard 214, the keyboard can also be connected with the microprocessor or controller. The communication device 200 can include a speaker, a microphone, random access memory (RAM), and flash memory all of which may be connected to the microprocessor or controller. Other similar components may be provided on the device as well and optionally connected to the microprocessor or controller.

An auxiliary I/O subsystem can take the form of a variety of different navigation tools (multi-directional or single-directional) such as a trackball navigation tool 210 as illustrated in the example shown in FIG. 2, or a thumbwheel, a navigation pad, a joystick, touch-sensitive interface, or other I/O interface. These navigation tools may be located on the front surface of the communication device 200 or may be located on any exterior surface of the communication device 200.

Other auxiliary I/O subsystems can include external display devices and externally connected keyboards (not shown). While the above examples have been provided in relation to the auxiliary I/O subsystem, other subsystems capable of providing input or receiving output from the communication device 200 are considered within the scope of this disclosure. Additionally, other keys may be placed along the side of the communication device 200 to function as escape keys, volume control keys, scrolling keys, power switches, or user programmable keys, and may likewise be programmed accordingly.

As may be appreciated from FIG. 2, the communication device 200 comprises a lighted display 206 located above the keyboard 214 constituting a user input and suitable for accommodating textual input to the communication device 200. The front face 202 of the communication device 200 has a navigation row 208. As shown, the communication device 200 is of unibody construction, also known as a "candy-bar" design.

Keys, typically of a push-button or push-pad nature, perform well as data entry devices but present problems to the operator when they are used to effect navigational control over a screen-cursor. In order to solve this problem, the present communication device 200 may include an auxiliary input that acts as a cursor navigation tool 212 and which is also exteriorly located upon the front face 202 of the communication device 200. Its front face location allows the tool to be easily thumb-actuable like the keys of the keyboard 214. An example provides the navigation tool 212 in the form of a trackball 210 which can be utilized to instruct two-dimensional screen cursor movement in substantially any direction, as well as act as an actuator when the trackball 210 is depressed like a button. The placement of the navigation tool 212 may be above the keyboard 214 and below the display screen 206; here, it can avoid interference during keyboarding and does not block the operator's view of the display screen 206 during use.

As illustrated in FIG. 2, the communication device 200 may be configured to send and receive messages. The communication device 200 includes a body 204 which may, in some embodiments, be configured to be held in one hand by an operator of the communication device 200 during text entry. The display 206 is included which is located on a front face 202 of the body 204 and upon which information is displayed to the operator during text entry. The communication device 200 may also be configured to send and receive voice communications such as mobile telephone calls. During a chat or instant messaging mode, the communication device 200 can be moved in a particular manner detectable and recognizable by the communication device using one or more of the orientation, motion, or image sensors (120, 118 or 113) illustrated in FIG. 1. For example, an accelerometer can detect the rapid successive shaking of the communication device in a particular manner or a particular number of times or an inclinometer can detect the tilting of the communication device in a particular direction or to a particular extent. Each motion or orientation detection can correspond to a stored or predetermined motion profile which can further cause the communication device to send a ping signal to a remote communication device 250 in a communication session or chat session with the communication device 200. The predetermined motion profile can further correspond to a ping signal that further includes predetermined information causing the remote communication device 250 to perform certain actions.

For example, the user of the device 200 in FIG. 2 is named Al. He is in a chat session with remote communication device 250 with a user named Jackie. Jackie is about to sign off, but Al shakes the communication device twice in rapid succession. The detected motion profile can correspond to "Profile 1" as show in FIGS. 4-5. Such detected motion profile can cause the communication device to send a ping to Jackie's remote communication device 250 and optionally automatically send a message such as "Hold On!" that corresponds to the particular motion profile detected. In other embodiments, the detected motion profile can cause the remote communication device 250 to correspondingly shake or to perform other sensory detectable functions such as lighting a light emitting diode 252 or display 254 with a particular color or at a particular flash rate. The ping signal can either include command signals causing the remote communication device 250 to perform the sensory detectable functions or the remote communication device 250 can be programmed or have settings that would cause the remote communication device 250 to perform the sensory detectable functions described above upon receiving a ping signal or both.

Figures 3, 4, 5, 6:
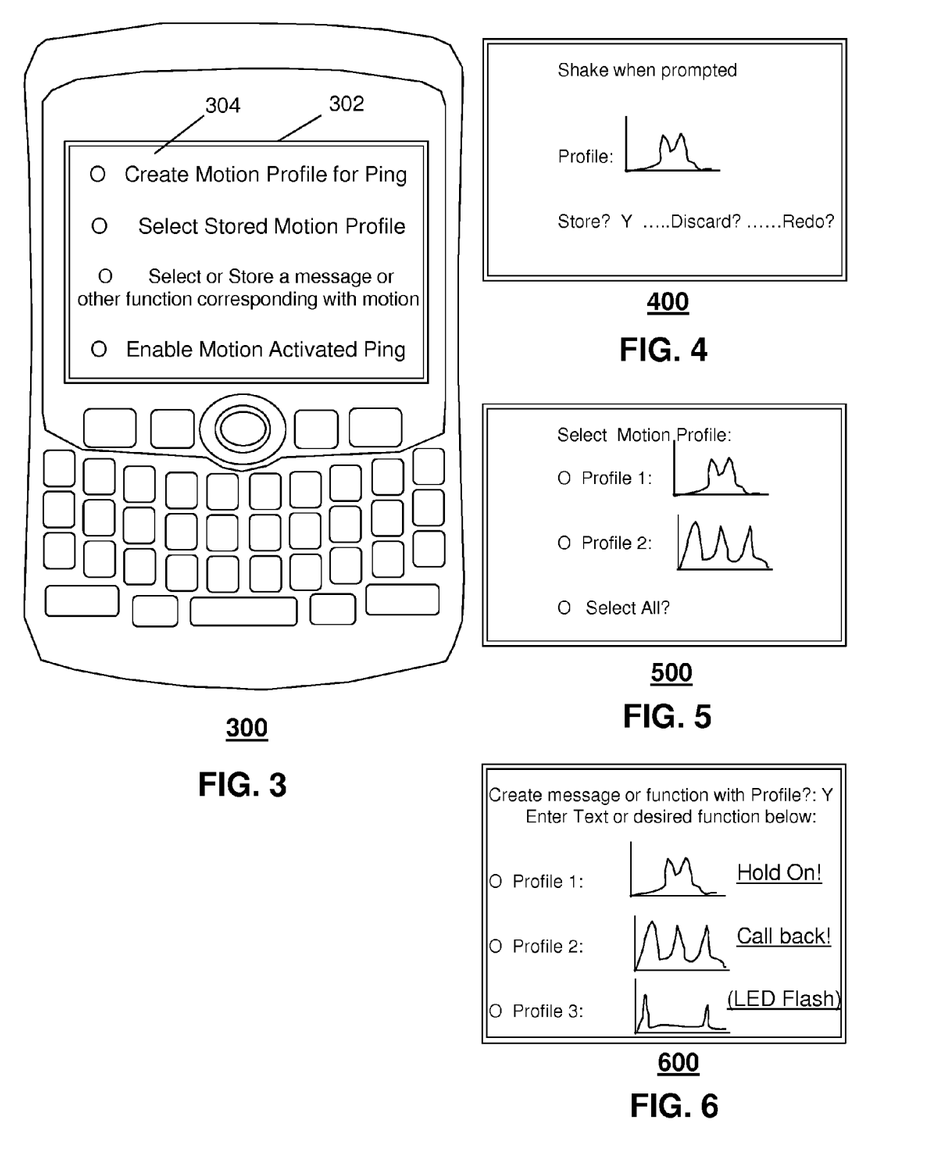
FIG. 3 depicts an example of another communication device and user interface.
FIGS. 4-6 depict illustrative examples of a user interface element of the communication device of FIG. 3.

FIG. 3 depicts a communication device 300 having a display 302 and user interface 304. In one example, the user interface 304 can provide a menu of options to create, select, store or enable a motion profile that can be associated with a ping signal. The communication device 300 can be provisioned with predetermined motion profiles, but such motion profiles can be customized or personalized by the user. For example, if an option to create a motion profile is selected, the communication device 300 can present a user interface or menu screen 400 as depicted in FIG. 4. The user interface 400 can prompt the user to shake or move or make a physical gesture with the communication device 300. The user interface 400 can optionally graphically represent the motion profile to provide the user with some visual feedback of the motion profile being recorded. The user interface 400 can further provide options to redo the shake or motion, to discard the recorded shake or motion, or to store the shake or motion as a pre-stored or predetermined motion profile. The user interface 304 can enable the selection of one or more stored motion profiles among a number of stored motion profiles as depicted in FIG. 5. Only two stored motion profiles are illustrated in a user interface 500 for simplicity, but note that any number of profiles can be stored and selected. The user interface 500 illustrates a first profile representative of a motion of two rapid shakes in succession and a second profile representative of a motion of three rapid shakes in succession. As explained above, one motion profile can be selected, a number of motion profiles can be selected or all motion profiles can be selected. Although some examples may be designed to detect a substantial match to one or more of the selected stored motion profiles, others can include greater flexibility or loser tolerances such that a closest matched stored selected motion profile can be automatically detected or additional prompts can be provided to confirm a desired motion profile when an exact match or a substantial match is not detected or found.

In another example, the user interface 304 of FIG. 3 provides an option to select or store a message or function to correspond or be associated with a particular stored motion profile. As illustrated in FIG. 6, a user interface 600 provides the option to select or enter a text message or associate a function with a particular predetermined motion profile. For example, "Profile 1" representative of two rapid successive shakes can be associated with a message such as "Hold On!" and "Profile 2" representative of three rapid successive shakes can be associated with a message such as "Call back!" A third profile or "Profile 3" representative of two interspersed shakes having a noticeable gap between shakes can be associated with a function such as an LED flash. When the motion activated ping function is enabled as an option (shown in FIG. 3) and Profile 3 is selected and the corresponding motion (two interspersed shakes) is detected, the communication device 300 will send a ping to a remote communication device during a chat mode with the communication 300 and further cause the remote communication device to flash an LED.

Figure 7:
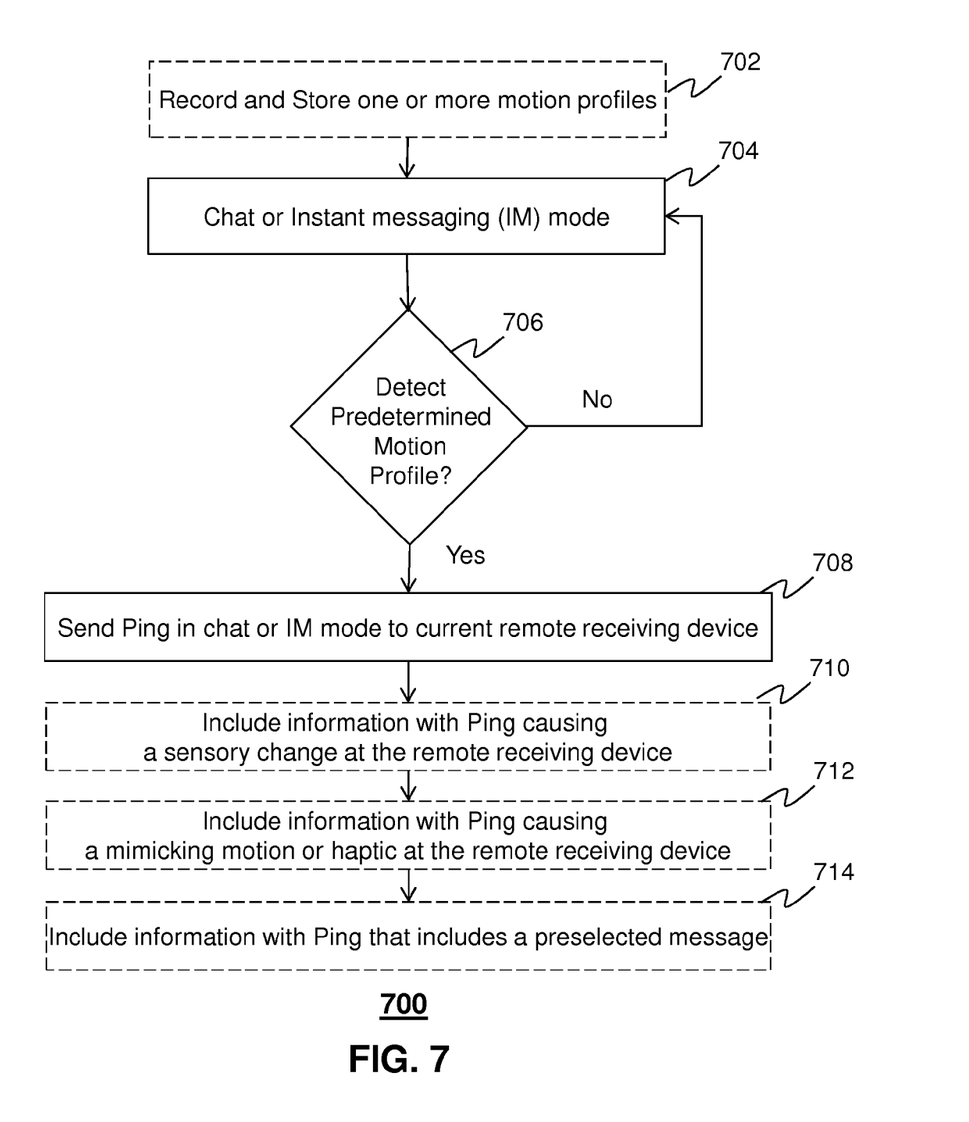
FIG. 7 depicts an example method operating in portions of the communication devices of FIG. 1, 2 or 3.

FIG. 7 depicts an illustrative method 700 that operates in portions of the devices of FIGS. 1-3. Method 700 can optionally begin with step 702 in which one or more motion profiles can be recorded and stored in a memory of a communication device. While the communication device is in a chat or instant messaging mode or session, as shown at 704, the method can detect a predetermined motion profile, at decision block 706. If no predetermined motion profile is detected at decision block 706, the method continues in the chat or instant messaging mode 704. If the predetermined motion is detected, at decision block 706, then the communication device can send, at 708 a ping signal to the remote receiving device in response to detecting the predetermined motion profile. As explained above, the detection can be performed by an accelerometer, a gyroscope, a GPS sensor, an inclinometer, a camera or other device that can detect motion or orientation. Such devices can be used to initially record the motion profiles in step 702 by a user of the communication device, but note that such motion profiles can be provisioned by the manufacturer or carrier and sold to the end user with such predetermined motion profiles already stored therein. At step 710, the sending of the ping can include sending the ping signal with information causing a sensory change to a remote receiving device during the chat mode. Such sensory change at the remote receiving device can include, but is not limited to, flashing an LED or display, changing colors of an LED or display, changing a flash rate at the LED or display, presenting a text message, presenting an audio message, presenting a ring tone, presenting a video clip, or activating a haptic device or actuator. In the case of a haptic device or actuator, at step 712, the detection of the predetermined motion profile can cause the sending of a ping along with information causing a mimicking motion at the remote receiving device. In other words, if the predetermined motion profile at the communication device detects and recognizes a predetermined motion profile having three successive shakes, the ping sent by the communication device can optionally send information causing the remote communication device receiving the ping to correspondingly shake three times. In yet another optional example, at 714, the communication device, in response to detecting a predetermined profile, can send a ping including information that includes or causes the presentation of a preselected message at the remote communication device.

Upon reviewing the aforementioned examples, it would be evident to an artisan with ordinary skill in the art that said examples can be modified, reduced, or enhanced without departing from the scope and spirit of the claims described below. For example, the simplest model can cause a typical ping signal to be sent upon detection of a predetermined motion profile. In other examples, ping signals sent by the communication device to the remote communication device can be a ping signal having minimal overhead information causing the remote or receiving communication device to perform certain functions or to present predetermined messages or other information. Some of the information included in the ping can include the predetermined message or information to be presented at the remote communication device. In other examples, the ping can include minimal information to cause presentation at the remote communication device where the predetermined message or information is stored at a network device or at the remote communication device itself. Other examples are contemplated by the subject disclosure.

It should be understood that devices described in the examples can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 8:
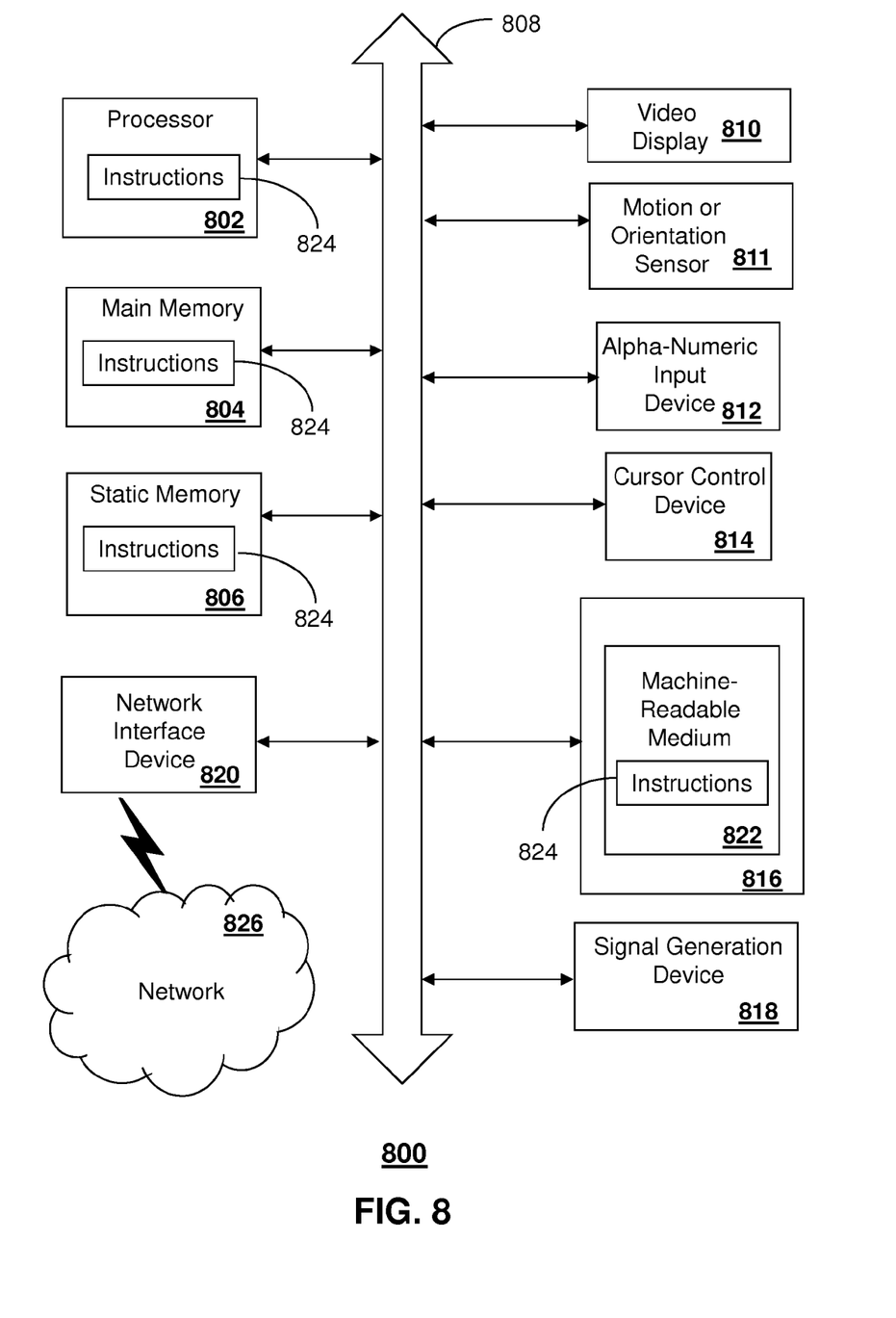
FIG. 8 depicts an illustrative diagrammatic representation of a machine in the form of a computer system within which a set of instructions, when executed, may cause the machine to perform any one or more of the methodologies disclosed herein.

FIG. 8 depicts an example diagrammatic representation of a machine in the form of a computer system 800 within which a set of instructions, when executed, may cause the machine to perform any one or more of the methods discussed above. One or more instances of the machine can operate, for example, as the communication device 100, 200, 250, or 300 as illustrated in FIG. 1, 2 or 3. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 804 and a static memory 806, which communicate with each other via a bus 808. The computer system 800 may further include a video display unit 810 (e.g., a liquid crystal display (LCD), a flat panel, or a solid state display. The computer system 800 may include a motion or orientation sensor 811, an input device 812 (e.g., a keyboard), a cursor control device 814 (e.g., a mouse or trackpad), a memory device 816 such as disk drive unit or solid state memory, a signal generation device 818 (e.g., a speaker or remote control) and a network interface device 820.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute non-transitory tangible computer-readable storage media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

While the tangible computer-readable storage medium 822 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) are contemplated for use by computer system 1500.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, are contemplated by the subject disclosure.

The Abstract of the Disclosure is provided with the understanding that it will not be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A communication device, comprising:
   a memory storing computer instructions; and
   a transmitter to send a ping signal to a remote receiving device;
   a processor coupled to the memory, and the transmitter, the processor, executing the computer instructions, performs operations comprising:
      communicating in a chat mode with a remote receiving device; detecting a predetermined motion profile during the chat mode;
   and
      sending the ping signal to the remote receiving device in response to detecting the predetermined motion profile, the ping signal including information causing a sensory change to the remote receiving device during the chat mode.

2. The communication device of claim 1, further comprising a sensor to detect the predetermined motion profile.

3. The communication device of claim 2, wherein the sensor comprises at least one of a gyroscope, a GPS sensor, an inclinometer, an optical sensor, audio-spectrum sensors, ultrasonic transmitters and sensors, an infrared sensor, and a proximity sensor.

4. The communication device of claim 2, wherein the sensor comprises an accelerometer.

5. The communication device of claim 2, wherein the sensory change to the remote receiving device comprises at least one of an activation of a different color of a light emitting diode, an activation of a different flash rate for the light emitting diode, an activation of a different color for a display, an activation of a different flash rate for the display, presenting an audio message, presenting a ring tone, presenting a video clip, and an activation of a haptic device.

6. The communication device of claim 1, wherein the processor performs further operations comprising sending the ping signal including information causing an activation of a haptic device at the remote receiving device.

7. The communication device of claim 6, wherein the haptic device mimics a motion corresponding to the predetermined motion profile detected at the communication device.

8. The communication device of claim 1, wherein the communication device comprises one of a smart phone, a personal digital assistant, and a computer.

9. A non-transitory computer-readable storage medium, comprising computer instructions which, responsive to being executed by at least one processor, cause the at least one processor to perform operations comprising:
communicating in a chat mode, by a communication device, with a remote receiving device;
detecting, by the communication device, a predetermined motion during the chat mode; and
sending a ping signal to the remote receiving device in response to detecting the predetermined motion, the ping signal including information causing a sensory change to the remote receiving device during the chat mode.

10. The non-transitory computer-readable storage medium of claim 9, further comprising computer instructions which when executed by the at least one processor cause the at least one processor to perform operations comprising presenting a graphical user interface providing options for defining the predetermined motion.

11. The non-transitory computer-readable storage medium of claim 10, wherein the sensory change to the remote receiving device comprises at least one of an activation of a different color of a light emitting diode, an activation of a different flash rate for the light emitting diode, an activation of a different color for a display, and an activation of a different flash rate for the display as defined by a profile setting at the remote receiving device.

12. The non-transitory computer-readable storage medium of claim 9, further comprising computer instructions which when executed by the at least one processor cause the at least one processor to perform operations comprising sending the ping signal including information causing an activation of an actuator device at the remote receiving device that mimics the predetermined motion detected at the communication device.

13. The non-transitory computer-readable storage medium of claim 9, further comprising computer instructions which when executed by the at least one processor cause the at least one processor to perform operations comprising recording and storing during a physical gesture a predetermined motion profile corresponding to the predetermined motion.

14. A method, comprising:
detecting, by a system including at least one processor, a predetermined motion profile during a chat mode with a remote communication device; and
sending, by the system, a ping signal to the remote receiving device in response to detecting the predetermined motion profile, the ping signal including information causing a sensory change to the remote receiving device during the chat mode.

15. The method of claim 14, comprising communicating, by the system, in the chat mode with the remote communication device.

16. The method of claim 14, wherein the detecting comprises detecting the predetermined motion profile using at least one of an accelerometer, a gyroscope, a GPS sensor, an inclinometer, and a camera.

17. The method of claim 14, further comprising recording and storing during a physical gesture the predetermined motion profile corresponding to the physical gesture.

* * * * *